P. R. VOORHEES.
Steering Ships by Steam and other Power.
No. 219,662. Patented Sept. 16, 1879.

WITNESSES:

INVENTOR

Figure. 1ª

P. R. VOORHEES.
Steering Ships by Steam and other Power.

No. 219,662. Patented Sept. 16, 1879.

WITNESSES
W. A. Dripps.
F. S. Medary.

INVENTOR
P. R. Voorhees

UNITED STATES PATENT OFFICE.

PHILIP R. VOORHEES, OF NEW YORK, N. Y.

IMPROVEMENT IN STEERING SHIPS BY STEAM AND OTHER POWER.

Specification forming part of Letters Patent No. 219,662, dated September 16, 1879; application filed July 30, 1878.

*To all whom it may concern:*

Be it known that I, PHILIP R. VOORHEES, of the city of New York, in the county and State of New York, have invented certain new and useful Improvements in Steering Ships by Steam or other Power, of which the following is a specification.

The invention constitutes an improvement upon the method of steering ships for which Letters Patent numbered 162,720 were granted to me on the 27th day of April, in the year 1875.

In the accompanying drawings, Fig. 1ª shows the end of the part 6 belonging to and described hereinafter as a portion of Fig. 1. Fig. 3ª is a part of Fig. 3, the connections between the two figures being separated, as shown by broken lines. Figs. 5 and 6 illustrate another arrangement of the said machinery illustrated in the general views of Figs. 1, 2, and 3. Figs. 7, 7ª, and 8 illustrate certain details of Figs. 5 and 6, hereinafter described.

Figure 1:
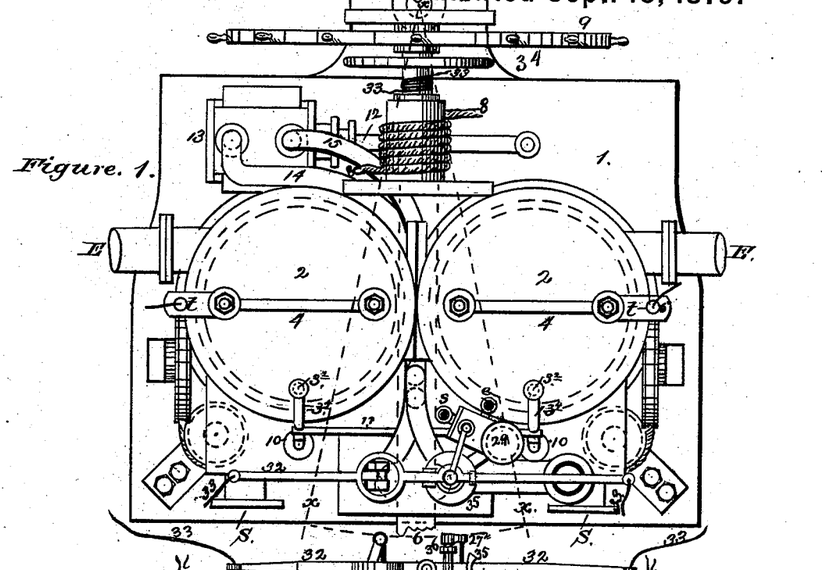
Figure 1 illustrates a plan of machinery embodying the improvements constituting this invention.
Figure 1A:
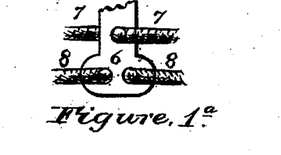
Figure 2:
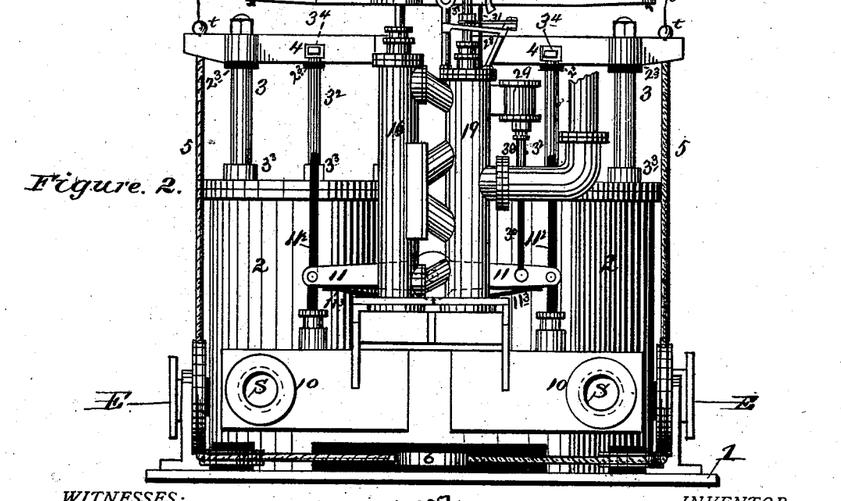
Fig. 2 is an end elevation, and Fig. 3 a side elevation, of the said machinery.
Figures 3, 3A:
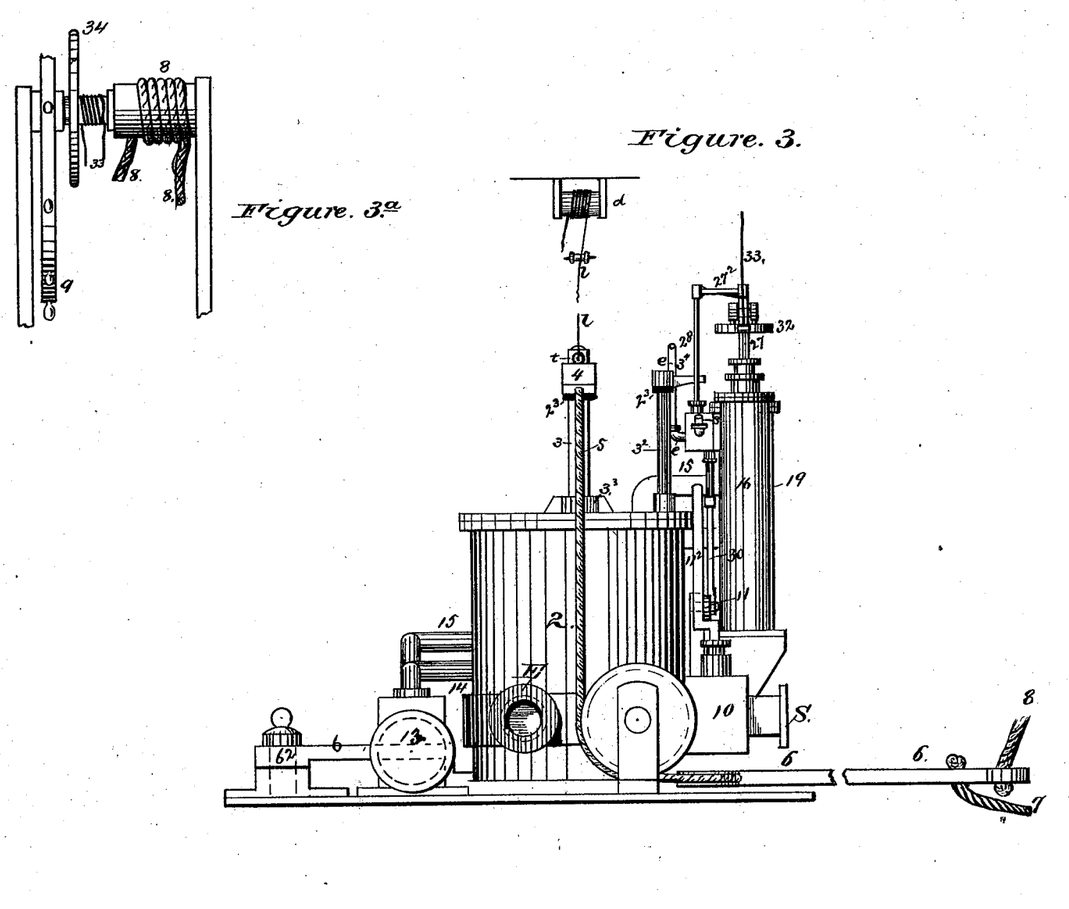

In Figs. 1, 2, and 3 of the drawings is illustrated a bed-plate, 1, to which are bolted two vertical steam-cylinders, 2, whose pistons are respectively provided with two piston-rods, 3, united by cross-heads 4, above the cylinder-heads. To the outer end of each cross-head are attached wire or other ropes 5, which, leading over sheaves, (shown in the drawings,) connect with the vibrating lever or tiller-beam 6. The said beam vibrates in a horizontal plane upon a center, 6², and extends beneath a portion of the cylinders 2, as indicated by the dotted lines *x x*. A portion of the lower flanges and walls of said cylinders is cut away for the said purpose, the bottoms proper of the cylinders being cast in above the plane of vibration of the tiller-beam 6. Other ropes or chains, 7 and 8, respectively, connect said beam with the rudder by attachment to a tiller or similar device secured thereto, and with the hand-power steering-wheel 9 on deck, in the usual manner.

The ropes 5, Fig. 3, are secured to the cross-heads 4 by toggles *t*, upon which the pull of the cross-heads is exerted when the rudder is moved by steam. To the said toggles are attached the ends of a small line, *l*, which line passes in several turns over a small drum or roller, *d*, Fig. 3, secured to the deck or to some fixed support above the cross-heads 4.

When no steam is used the cross-heads 4 remain at rest, and exert no strain upon the toggles *t*, the beam 6, or the rudder. Consequently the weight of the ropes 5 is then held by the line *l*, which, passing around the idler-roller *d*, forms an endless line with said ropes. This simple device thus takes up the slack of the ropes 5 and effectually prevents the fouling of said ropes when the vibrating beam 6 is operated by hand-power alone, for then the ropes 5 "render" through the eye of each cross-head suitable fair-leaders, or sheaves may be provided for the purpose.

Each steam-cylinder 2 is provided with a steam-chest and valve, 10, which valves admit steam beneath the pistons only, and as the said valves descend or approach the steam-ports in the cylinders. The valves 10 are operated by a valve-beam, 11, attached to the valve-stems $11^2$, and vibrating upon a beam-center, as shown in the drawings.

The spring $11^3$ restores the valves 10 to their mid-position, in which position both the steam and exhaust ports of the cylinders 2 are closed. The valve-stems $11^2$ are formed with an offset, and are prolonged upward, as seen in the drawings, Fig. 3.

The cylinders 2 are each provided with a small piston-rod, $3^2$, secured in the main pistons within said cylinders, and having each an arm, $3^4$, one of which arms, when either piston is at the bottom of its stroke, rests nearly upon the head of one of the valve-stems $11^2$, and thus brings the main valves 10 to a closed mid-position.

The piston-rods 3 and $3^2$ may be provided with rubber disks or other springs $2^3$ under the cross-heads 4 and arms $3^4$. The weight of the main pistons within the cylinders 2 will thus rest upon the guide-fillets $3^3$ in the cylinder-heads when the pistons are at the bottoms of the cylinders, and thus all jar and danger of breaking either top or bottom cylinder-heads will be avoided. Buffers may also be provided at any suitable part of the bed-plate or base of the cylinders 2 for the vibrating beam 6, and spring-links may unite said beam and any of the ropes or chains connected to it. To the tiller-beam 6 is suitably connected, by rods and pins, as shown in the drawings, the piston and its rod 12 of the hydraulic cylinder 13, which cylinder, secured to the bed-plate 1, is connected, by the pipes 14 and 15, to the hydraulic valve-chambers 16 and 19. This hydraulic valve-gear is a very important feature of this invention, and consists of the following-described parts, fully shown, partly in section, in Fig. 4. In said figure the pipes 14 and 15 are shown shortened into passages, the hydraulic cylinder 12 and valve-chambers 16 and 19 being closely united. This construction depends, however, entirely upon convenience of arrangement.

Figure 5:
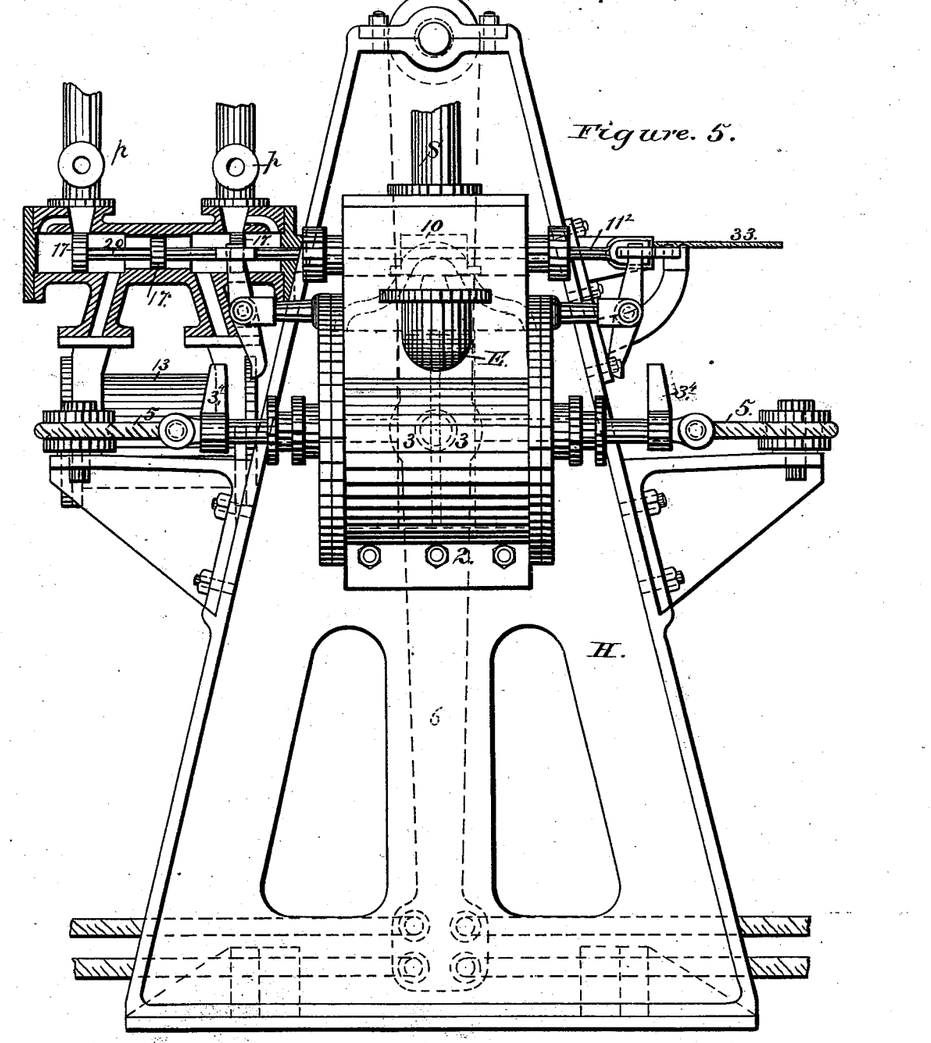

In the chamber 16 is a valve or ram consisting of two simple disks, 17, separated by a partition, 18, and secured to the same rod or stem 20. The said disks, if desired, may be partially balanced by another disk or disks of either greater or less area than the disks 17, and attached to the same rod, as shown in Fig. 5. The valve-chambers 16 and 19 are connected by four ports or passages, 21 $21^2$, and the latter chamber is provided with one central port, 26, connecting with a pipe, $26^2$, forming a simple hydraulic column or stand-pipe, which, like an accumulator, may be fitted, if desired, with a weighted piston, or said pipe may be connected with the sea. The chamber 19 is also provided with a valve, 22, which is simply a cylinder divided into compartments by the partitions $22^2$ $22^3$, and having parts of the circumference cut away, as shown at 24, in order to admit of the passage of the fluid through the valve. The remaining peripheral parts of the cylinder act as guides for the valve 22.

The annular ribs 25, cast upon the interior of the valve-chamber 19, are the bearing-surfaces for said guides, and by their presence admit of the passage of fluid between said guides and the interior walls of said chamber.

The partitions $22^2$ in the valve 22 are provided with holes $a$ $b$, which open a communication for fluid-pressure on both sides of the disks 17 in the chamber 16.

The stem 27 of the hydraulic valve 22 is connected, by an arm, $27^2$, to the steam-valve stem 28, whose valve $28^2$ governs the motion of the piston within the small steam-cylinder 29, whose piston-rod 30 is attached to the main valve-beam 11; but the hydraulic valve 22 may be suitably connected with any valve of the engine, whether the throttle-valve or any auxiliary or main valve.

The small steam-cylinder 29 is secured to the upper part of the hydraulic valve-chamber 19. The spring 31, or other suitable springs, may be placed at any convenient point or points in contact with either the valve-stem 27, as shown in the drawings, or in contact with the valves or rods acting in conjunction therewith.

The lever 32 is connected to the rod 20 of the ram 17, as shown in the drawings, and being also connected by light wire or other lines 33 to the auxiliary wheel 34 on deck, the connections for operating the rudder become complete.

The letters S and E and $s$ and $e$, respectively, designate the steam and exhaust pipes of the main and auxiliary cylinders 2 and 29.

The operation of the machinery completed as described is as follows: In order to move the rudder, the helmsman has but to move the auxiliary wheel 34, and in so doing the fluid between one of the disks 17 and the end of the chamber 16 will be forced through one of the passages 21 into the valve-chamber 19 against one of the partitions $22^2$ in the valve 22, thus moving said valve against the resistance of the spring 31, which movement opens the communication, through the valve 22, between one of the passages $21^2$ and the port 26, which opening will permit the fluid in the hydraulic cylinder 12 to flow out in front of the moving piston 13, through one of the passages or pipes 14 15, and into and through the chambers 16 and 19, and at the same time to flow from the said chambers back through either one or the other opposite passage or pipe 14 15 into the hydraulic cylinder 12 behind the moving piston 13, the hydraulic column in the pipe $26^2$ furnishing a sufficient head, and also supplying any ordinary leakage that may occur. The hydraulic valve 22 while thus opened carries with it the small steam-valve $28^2$, their respective valve-stems 27 and 28 being united by the arm $27^2$, and the valve $28^2$ being thus opened admits steam to the small cylinder 29, whose piston, connected by its rod 30 to the valve-beam 11, immediately opens the main valves 10—one to the steam, the other to the exhaust—which causes one of the main pistons within the steam-cylinders 2 to rise and the other consequently to descend, thus moving the rudder through the intervention of the ropes 5 and the vibrating beam 6, as already described; but this movement will continue only so long as the ram 17 is kept in motion by the helmsman in moving the auxiliary wheel 34. As soon as he stops said wheel, no unbalanced fluid-pressure being exerted upon the valve 22 at either end, the spring 31 immediately forces said valve into its mid-position, in which position it is closed, the holes $a$ $b$ in the partitions and guides of the valve 22 permitting of the closing of the valve by allowing the fluid within the chamber 19 to pass through said holes as the valve is moved by the spring 31. The hydraulic valve 22 in thus closing carries with it and closes the small steam-valve $28^2$, which it had previously opened, and which thus closed cuts off the steam in the small cylinder 29, and simultaneously opens the exhaust-port of said cylinder, by reason of "negative lap" on the exhaust side of the valve, as seen at $c$, Fig. 4. All pressure being thus relieved from the piston within the cylinder 29, which piston had previously opened the main steam-valves 10, the said piston will offer no opposition to the spring $11^3$, which will therefore throw the valve-beam 11 back into mid-position, thus closing the main valves 10 and excluding the further entrance and exit of steam to and from either of the main cylinders 2. Neither the hydraulic piston 13, therefore, nor the rudder can be again moved as long as the valve 22 remains closed, and said valve cannot be opened without again moving the ram 17.

The area of the holes $a\, b$ is made so small in proportion to the area of the disks 17 that the water or other fluid forced by said disks upon the valve 22 cannot escape fast enough through said holes to prevent the valve 22 from rapidly opening while said disks are in motion; but immediately upon the stoppage of said disks the position of the said holes is such, and their area is so graduated, as to permit the spring 31 to reclose the valve 22 at any required speed.

Should by any chance the ram 17 be thrown over so near to the end of its stroke that no more water be available in the chamber 16 at that end of the stroke for reopening the valve 22, an extension-toe, 35, is fitted to the lever 32, so that said toe can, just before the end of said lever's stroke, come in contact with the valve-stem 27, or with suitable stops or a rack thereon, and thus hold the valve 22 open as long as desired. The nuts 36 37, Fig. 4, act as stops for the toe 35. Should the helmsman, however, continue to hold the toe 35 in contact with the valve-stem 27, by keeping the auxiliary wheel 34 hard over to either side after the rudder is hard over, and therefore by his own act not close the valves of the machine, the arm $3^4$ on the descending piston-rod $3^2$ will, just before it reaches the end of its stroke, bear upon the head of one of the valve-stems, $11^2$, and then bring the valves 10 to a closed position for both the main steam and exhaust ports of the cylinders 2.

The piston-rod 30 will, by this movement of the valve-beam 11, to which it is united, reverse its piston within the small steam-cylinder 29, the steam therein interposing no obstacle, for, the valve $28^2$ of said cylinder being held open by the helmsman, the boiler-pressure will be the same upon one side of the large steam-piston within one of the cylinders 2 and upon the opposite side of the small piston on the rod 30 within the cylinder 29. The rudder is thus easily and firmly held "hard over" until the helmsman desires to change its position, the main steam-valves having automatically closed without either his knowledge or concern.

Immediately upon reversing the auxiliary wheel 34, and with it, of course, the ram 17, long before said ram arrives at the center of its stroke, the valve-stem 27 is released from its contact with the toe 35, and the hydraulic valve 22 and the small steam-valve $28^2$ then quickly close through the action of the spring 31, as before described.

If it is desired to either reverse the rudder but a few degrees without putting it back amidships, or to move it from any point but a few degrees in either direction, a slight reversal of the auxiliary wheel 34 immediately, and before said wheel reaches its amidships position, forces a column of fluid upon the reverse side of the valve 22, already closed in advance of the reversal of said wheel, and quickly and sufficiently opens said valve for the desired reversal of the rudder. The simple movement of the auxiliary wheel 34 thus operates the ram 17, by which all organs of the machine and the rudder itself are governed.

Every movement of the auxiliary wheel 34 in the hands of the helmsman thus perfectly simulates the ordinary and conventional movements of the ordinary steering-wheel, the helm promptly obeying the movements of the auxiliary steering-wheel 34, stopping when said wheel is stopped, and going immediately either to starboard or to port, slowly or rapidly, according as the helmsman starboards or ports said wheel.

If steam be not used, or should it, for any reason, fail, motion given to the ordinary hand-power steering-wheel 9 will instantly operate the rudder through the interposition of the vibrating beam 6 and the ropes or chains 7 and 8, neither the steam-pistons nor the hydraulic gear interposing any obstruction to the hand-power, for the steam-pistons will fall by gravity to the bottoms of the cylinders 2, or be there drawn by the hand-power acting through the main steering-wheel 9 and the vibrating beam 6 and ropes 5, assisted by gravity, and there said pistons will remain until steam be readmitted to either one of the cylinders 2. Thus no disconnecting devices are either fitted or required to be operated before changing from steam-power to hand-power steering. Should the weather and sea be such as with ordinary steering-gear to render necessary the use of relieving-tackles, the mere holding fast of the auxiliary wheel 34 itself, as well as the main hand-power wheel 9, a "tell-tale" of the position of the helm and rudder, will hold the helm and rudder exactly in the position in which the rudder had previously been put either by steam or by hand power. No appliances, therefore, other than this hydraulic gear, such as either brakes or deck-tackles, need be brought to the assistance of the hand-power at the helm, either when assisted by steam-power or when entirely unassisted by other power.

By means, therefore, of this hydraulic gear the steadiest steering can always be maintained, not only in a heavy sea and in gales of wind, but also against the expansive action of the steam itself after it has been cut off by the closing of the steam-valves. Such expansive action, unless properly guarded against, will carry the rudder too far beyond the angle desired to be given to it, and constitutes a defective feature inherent in all steam-steering machinery, which it is one of the objects of this invention to efficiently obviate. This is a very important point, for without some efficient check to such expansive action steady steering is impossible.

The hand and steam power absorbed in order to operate this hydraulic gear is insignificant compared with that absorbed in operating friction-brakes, to say nothing of the more numerous and distracting attentions required to operate such devices. With this hydraulic gear the tendency of the rudder to move will be instantly communicated to the hand of the helmsman holding the auxiliary wheel 34 through the hydraulic pressure exerted by the hydraulic piston 13 upon the nearly-balanced disks 17. The said disks will thus communicate the "feel" of the rudder to the hand of the helmsman with a varying force, depending upon the force imparted to the rudder either by the sea or by the steam-power, and proportionate to the unbalanced area of the said disks. This unbalanced area can be so nicely adjusted as to enable the helmsman to operate the rudder with great ease and precision by manipulating the auxiliary wheel in the manner already fully described. This securing of the feel of the rudder through the auxiliary wheel and hydraulic gear, in addition to the usual method through the main wheel-ropes, is another very important adjunct for the helmsman, in giving him complete control over the rudder and the machinery by which it is operated.

It is evident that, if desired, some form of centrifugal pump may be substituted for the hydraulic disk 17, and like them force a column of fluid upon the valve 22 for opening it without departing from the principle underlying the operation of this hydraulic gear.

From the description above given it is obvious that this hydraulic gear may also form a very valuable addition to the hand-steering gear of all sea-going vessels not fitted with steam-steering power, supplying as it does a convenient and superior substitute for the ordinary relieving-tackles commonly used in heavy weather, and being easily and evenly intuitively operated by the helmsman himself without any distraction of his attention, and dispensing with the additional labor of men to work relieving-tackles.

The valve 22 has been described as a simple cylinder; but, of course, the partitions therein may be united by a rod or rods, the cylindrical portions only forming guides for the valves, and the lengths of such guides determining the lengths of the valve-ports, the widths of said ports being determined by the amount of the cylindrical portion cut away.

It is also obvious that the valve 22 may be divided transversely in the center and each end provided with a separate rod, thus causing one shorter valve to serve each port of the hydraulic cylinder 13, instead of one longer valve to serve both ports of said cylinder.

It is also obvious that a plunger secured to each side of the tiller-beam 6 will perform the same function as the double-acting piston 12 within the hydraulic cylinder 13, and such plungers may be substituted therefor. The disks 17 may also operate in two cylinders instead of in one cylinder, and upon separate rods united by a line or by a beam, as in my aforesaid patent of 1875. All of these arrangements, however, must depend upon the discretion of the constructing engineer in utilizing the space at his command for locating the machinery.

In the arrangement of this steering machinery illustrated in Figs. 5 and 6 a vertical instead of a horizontal tiller-beam is shown. This arrangement of vertical tiller-beam 6 is considered of special importance for steamers provided with inverted vertical cylinders secured to a housing over the crank-shaft, as thereby the steering machinery can be combined with said housing or framing, and thus will be constantly under the eye and care of the engineer on duty in the engine-room, and will occupy only the space assigned to the engine-compartment of the ship, and but little of such space. In Figs. 5 and 6 but one horizontal steam-cylinder, 2, containing two single-acting pistons, 3, has been substituted for the two vertical cylinders 2, containing each one single-acting piston, 3, (illustrated in Figs. 1, 2, and 3;) but vertical cylinders instead of a horizontal cylinder secured to the housing H may be as well, and preferably, used with the vertical tiller-beam 6, vibrating within or upon said housing, particularly if the gravity of the pistons be desired to assist in placing them in a fixed position when steering by hand-power alone.

It is obvious also that this steering machinery may be readily combined with and secured to the framing and bed-plate of different types of marine engines in such form of arrangement as circumstances shall require. The horizontal cylinder 2 (shown in Figs. 5 and 6) requires but one steam-valve, 10, acting in common for the two pistons 3 3, which pistons pull, each in turn, upon the vertical tiller-beam 6 by means of wire or other ropes 5, connected to said beam by slotted links L. (Shown in detail in Figs. 7 and 7ª.) These links pull upon pins 6³, secured in the vertical tiller-beam 6, each link pulling in but one direction, so that when the said beam is operated by hand-power alone the beam-pins will traverse within the slots of the links, and thus the tiller-beam ropes 5 will not be slacked up, but will remain stretched by the weight and resistance of the said links. These links L in effect perform the same office as the idler-roller $d$ and endless line $l$, hereinbefore described in connection with the tiller-beam 6 and cross-heads 4, Fig. 3.

In Figs. 5 and 6 the hydraulic ram 17 is shown as constructed of three disks of differential areas, and the main steam-valve 10 is shown as operated by hand alone and without the interposition of the automatic hydraulic cut-off valve 22 and the small auxiliary steam-cylinder 29, shown in Figs. 1, 2, and 3.

Figure 4:
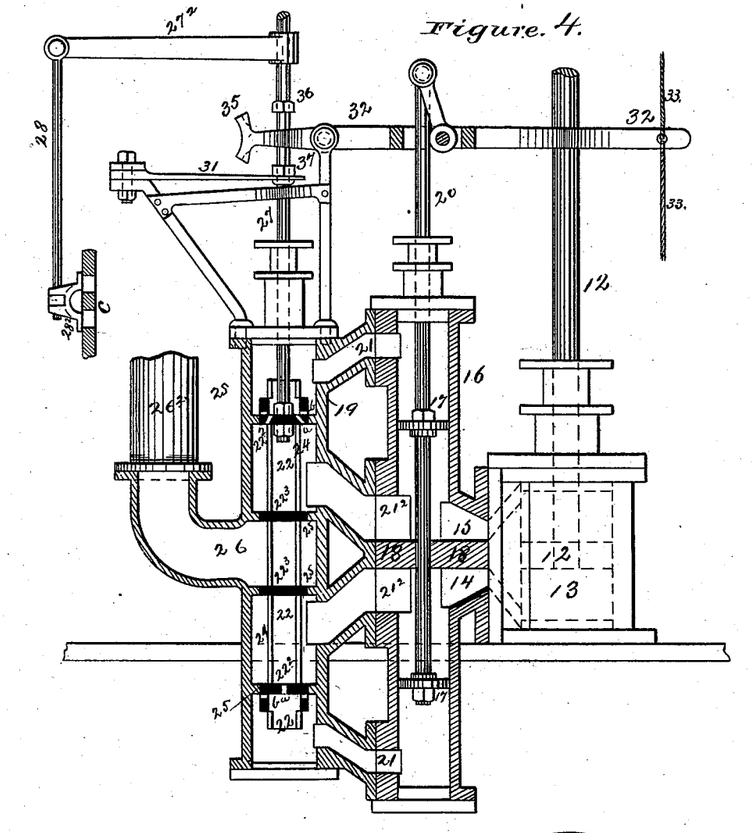
Figs. 4 and 4ª, respectively, show an enlarged section through the hydraulic part of the machinery illustrated in the preceding figures and an end elevation of the same.
Figure 4A:
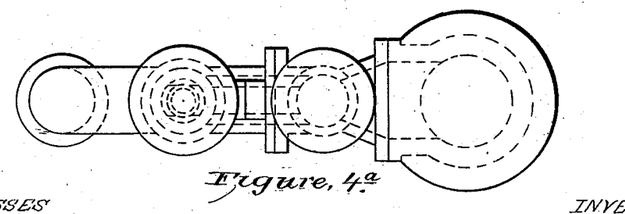
Figures 7, 7A, 8:
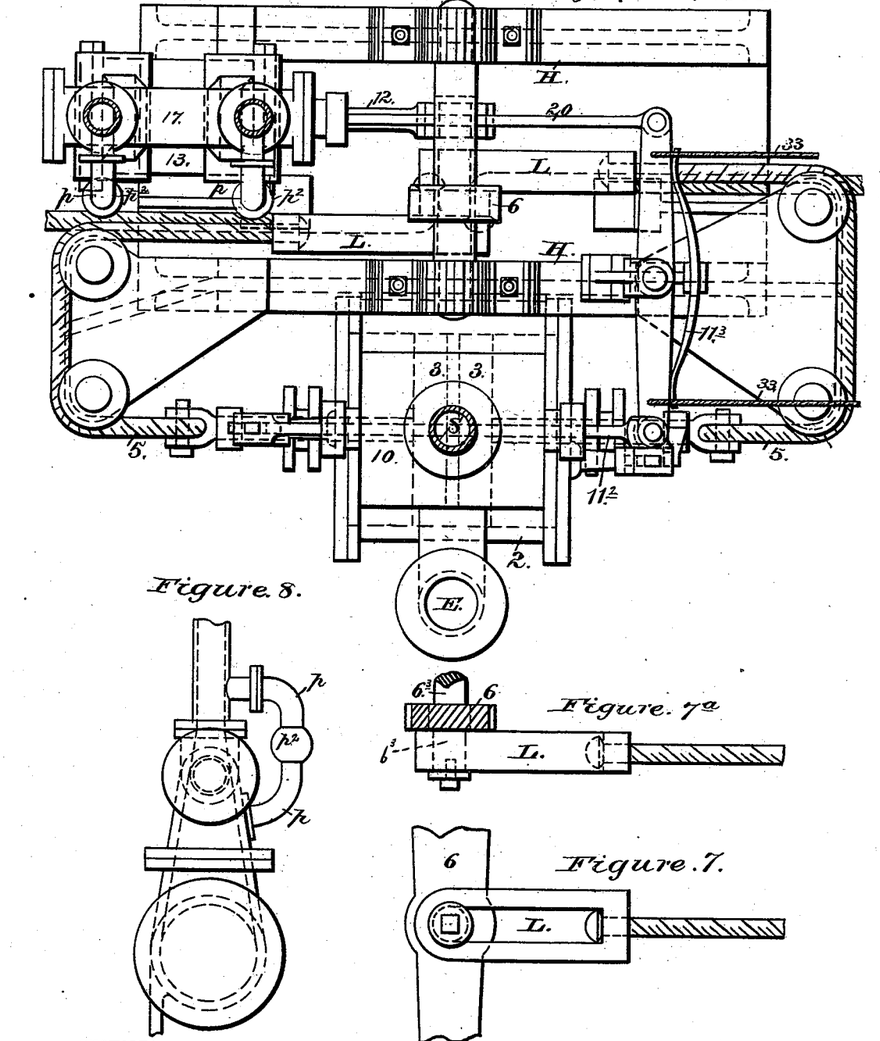

Fig. 8 is an end elevation of the hydraulic gear illustrated in Figs. 5 and 6, showing the side pipes, $p\ p$, containing check-valves $p^2$ for admitting the fluid used in the hydraulic cylinder to flow in behind its receding piston, but to automatically close whenever said piston approaches either check-valve. These check-valves, also used in my aforesaid patent of 1875, may or may not be used, in the discretion of the constructing engineer, when the hydraulic cut-off valve 22, Fig. 4, is used. The hydraulic cut-off valve 22 and the small steam-cylinder 29 have been omitted from the Figs. 5 and 6 in order to avoid unnecessary repetition, although the hydraulic gear, as shown in said figures, will efficiently operate the rudder, though not in a large machine, with as little expenditure of hand-power, nor as so truthful a tell-tale of the position of the rudder as will the more complete form of hydraulic gear shown in Figs. 1, 2, and 3.

All the valves for actuating this machinery may be both suitably balanced and counterbalanced, and may be given such lap and lead as shall best conduce to efficient performance. Sufficient lead may be given upon the exhaust side of the steam-valves to insure a free passage out of the cylinders for any water of condensation which may be formed therein.

Either water led in pipes from the sea, or otherwise, or oil or other suitable liquid may be used in the hydraulic cylinder and form a weighted hydraulic column of moderate height, as hereinbefore described, and where danger of freezing is apprehended a mixture of water and glycerine or alcohol may be used.

In iron-clad and other steamers not fitted with spars and sails, where the capability of automatic disengagement of the steam and hand power is not deemed of material importance, one cylinder and its attachments may be dispensed with, thereby reducing the space required for such parts without diminishing the power of the machinery, for the remaining cylinder may be made double-acting by the usual steam-valve and rod connections controlled by the hydraulic gear herein described.

It is obvious that different forms of engines, having one or more cylinders with piston-rods either pulling or pushing directly against instead of pulling by ropes a tiller beam or beams, may be used, as circumstances may determine, the advantage and main object of employing two single-acting pistons being in order to accomplish the very important purpose of dispensing with the necessity of employing any clutch or disconnecting device between the steam-machinery and the hand-steering wheel. This being accomplished, the entire machinery practically becomes as automatic as possible.

With this steering-gear no time can possibly be lost in disconnecting any part of the machinery should steam suddenly fail, for there is nothing to be disconnected, and, what is of pre-eminent importance, no possible confusion can arise upon any occasion, ordinary manual effort only being required upon the main wheel to at all times operate the rudder should it not instantly move in response to the movements of the auxiliary wheel. The same effect is always produced upon the rudder by the same operation of either wheel. Both of said wheels are equally at the helmsman's command, and each wheel, by its own position, fully advises him of the angle of the rudder, regardless of the point to which the ship heads, and by means of either of the said wheels the helmsman at all times maintains the feel of the helm.

Having thus fully described this steering machinery as of my invention, I claim—

1. In a system of steam or other fluid power machinery for steering a ship, in combination with the ship's rudder or tiller and a hand steering-gear, an engine of one or more cylinders provided with single-acting pistons, connected to said rudder substantially in the manner described, whereby, when the hand-power alone is used to move the rudder, said pistons are brought to rest, and the slack of the rope or other rudder connections is taken up, all without disconnecting said engine from either the hand-gear or rudder, substantially as set forth.

2. In a system of steam or other fluid power machinery for steering a ship, an auxiliary piston, a main power-piston, and a valve or valves operated by said pistons in the manner substantially as described, whereby the source of the actuating-power is automatically cut off whenever the rudder comes hard over to either side, substantially as and for the purpose set forth.

3. In a system of steam or other fluid power machinery for steering a ship, an auxiliary cylinder and piston provided with a valve operated by a self-closing regulating valve or piston, in combination with a valve or valves operated by said auxiliary piston, whereby the actuating-power is either transmitted to or its source cut off from said machinery, substantially as and for the purpose set forth.

4. In a system of steam or other fluid power machinery for steering a ship, in combination with and operating one or more valves for operating or controlling said machinery, one or more regulating-valves or pistons opening by fluid-pressure and self-closing, whereby the actuating-power is transmitted to and also its source cut off from said machinery, substantially as and for the purpose set forth.

5. In a system of steam or other fluid power machinery for steering a ship, in combination with and operating one or more valves for operating or controlling said machinery, one or more self-closing regulating valves or pistons and a hand-operated pump or piston opening the same through the medium of an interposed fluid, whereby the actuating-power is transmitted to said machinery while said pump is kept in motion, and the source of actuating-power cut off while said pump remains at rest, substantially as and for the purpose set forth.

6. In combination with a ship's rudder and a cylinder or cylinders connected thereto in the manner described for holding the same, one or more self-closing valves or pistons and a hand-operated pump opening the same through the medium of an interposed fluid, whereby the rudder is permitted to move or is held at rest at the will of the helmsman, substantially as and for the purpose set forth.

PHILIP R. VOORHEES.

Witnesses:
GEORGE OWEN,
WARD McLEAN.